(12) United States Patent
Crandall

(10) Patent No.: US 8,000,011 B2
(45) Date of Patent: Aug. 16, 2011

(54) SIGHTING OPTICS INCLUDING AN OPTICAL ELEMENT HAVING A FIRST FOCAL LENGTH AND A SECOND FOCAL LENGTH

(75) Inventor: David Lynn Crandall, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 12/785,892

(22) Filed: May 24, 2010

(65) Prior Publication Data
US 2010/0238554 A1    Sep. 23, 2010

Related U.S. Application Data

(62) Division of application No. 11/831,581, filed on Jul. 31, 2007.

(51) Int. Cl.
G02B 5/18    (2006.01)
(52) U.S. Cl. ............... 359/569; 359/574; 42/111
(58) Field of Classification Search .......... None
See application file for complete search history.

(56) References Cited

U.S. PATENT DOCUMENTS

| | | |
|---|---|---|
| 2,679,474 A | 12/1949 | Pajes |
| 5,017,000 A | 5/1991 | Cohen |
| 5,148,314 A | 9/1992 | Chen |
| 5,446,588 A | 8/1995 | Missig et al. |
| 5,969,864 A * | 10/1999 | Chen et al. ............ 359/569 |
| 6,104,533 A | 8/2000 | Clark et al. |
| 6,336,285 B1 | 1/2002 | Baumer |
| 6,360,471 B1 | 3/2002 | Stein |
| 6,881,947 B2 | 4/2005 | Mitsuoka et al. |
| 6,982,840 B1 | 1/2006 | Schlief |
| 7,069,684 B2 | 7/2006 | Smith |
| 2002/0066220 A1 | 6/2002 | Mallay |

FOREIGN PATENT DOCUMENTS

DE    3102976 A1    8/1982

OTHER PUBLICATIONS

International Search Report and Written Opinion of the International Searching Authority, International Application No. PCT/US07/74877, International Filing Date Jul. 31, 2007.
Stigliani, Jr., Daniel J., et al., Resolving Power of a Zone Plate, Journal of the Optical Society of America, May 1967, pp. 610-613, vol. 57, No. 5.
Young, M., Zone Plates and Their Aberrations, Journal of the Optical Society of America, Aug. 1972, pp. 972-976, vol. 62, No. 8.
Zone Plate, http://en.wikipedia.org/wiki/Zone_plate, retrieved Oct. 4, 2010, 4 pages.

* cited by examiner

*Primary Examiner* — Arnel C Lavarias
(74) *Attorney, Agent, or Firm* — TraskBritt

(57) ABSTRACT

One embodiment of sighting optics according to the teachings provided herein may include a front sight and a rear sight positioned in spaced-apart relation. The rear sight includes an optical element having a first focal length and a second focal length. The first focal length is selected so that it is about equal to a distance separating the optical element and the front sight and the second focal length is selected so that it is about equal to a target distance. The optical element thus brings into simultaneous focus, for a user, images of the front sight and the target.

14 Claims, 4 Drawing Sheets

US 8,000,011 B2

SIGHTING OPTICS INCLUDING AN OPTICAL ELEMENT HAVING A FIRST FOCAL LENGTH AND A SECOND FOCAL LENGTH

CROSS-REFERENCE TO RELATED APPLICATION

This application is a divisional of U.S. patent application Ser. No. 11/831,581, filed Jul. 31, 2007, pending entitled "Sighting Optics and Methods for Sighting," the disclosure of which is hereby incorporated herein by this reference in its entirety.

GOVERNMENT RIGHTS

This invention was made with government support under Contract Number DE-AC07-05ID14517 awarded by the United States Department of Energy. The government has certain rights in the invention.

TECHNICAL FIELD

This invention relates to sighting optics in general and, more specifically, to sighting systems for weapons.

BACKGROUND

Many different types of sighting systems are known in the art and are used to assist in the aiming of a variety of devices, typically those used to launch projectiles, such as firearms and bows, although they are used in other applications as well. Perhaps the simplest and most rugged type of sighting system is the so-called "iron sight," which refers to the open, unmagnified aiming system typically used on firearms. An iron sight usually comprises a front sight and a rear sight. The front sight may take the form of a post, bead, or ring-shaped structure, whereas the rear sight may take the form of a notch or aperture. The rear sight is often made adjustable to allow the user to more easily compensate for windage or elevation, although in some applications the front sight is also adjustable.

Iron sights work by providing horizontal and vertical reference points that allow the user to align the weapon with the intended target. Once the front and rear sights are aligned with one another, they are placed in correct relation to the target. However, since the human eye is only capable of focusing at one distance at any given time, it is not possible for a user to focus simultaneously on the front sight and the target. As a result, the aiming process is degraded. That is, the user must first focus on the front sight in order to align the front and rear sights. The user must then re-focus on the target and then place the now out of focus front sight on the target. Because the front sight is out of focus, it is difficult to place the front sight at the precise position in relation to the target to produce a hit.

While telescopic sights represent an improvement over iron sights in that the target and reticle are simultaneously focused for the user, telescopic sights are expensive, heavy, relatively bulky, and easily subject to damage and/or misalignment due to rough handling. As a result, telescopic sights are typically limited to applications where cost and weight are not significant issues and where proper care can be exercised to avoid damage and/or misalignment.

SUMMARY

Sighting optics, according to one embodiment of the invention, may comprise a front sight and a rear sight positioned in spaced-apart relation. The rear sight includes an optical element having a first focal length and a second focal length. The first focal length is selected so that it is about equal to a distance separating the optical element and the front sight, whereas the second focal length is selected so that it is about equal to a target distance. The optical element thus brings into simultaneous focus, for a user, images of the front sight and the target.

Also disclosed is a method for sighting that includes: providing a front sight on a device to be sighted; positioning an optical element with respect to the front sight so that the optical element is located between the front sight and a user's eye when the device is in an operative position with respect to the user; viewing the front sight and the target through the optical element, the optical element bringing into substantially simultaneous focus the front sight and the target; and moving the device so that the front sight is in a desired relation to the target.

BRIEF DESCRIPTION OF THE DRAWINGS

Illustrative embodiments of the invention are shown in the accompanying drawings in which.

DETAILED DESCRIPTION

Figure 1:
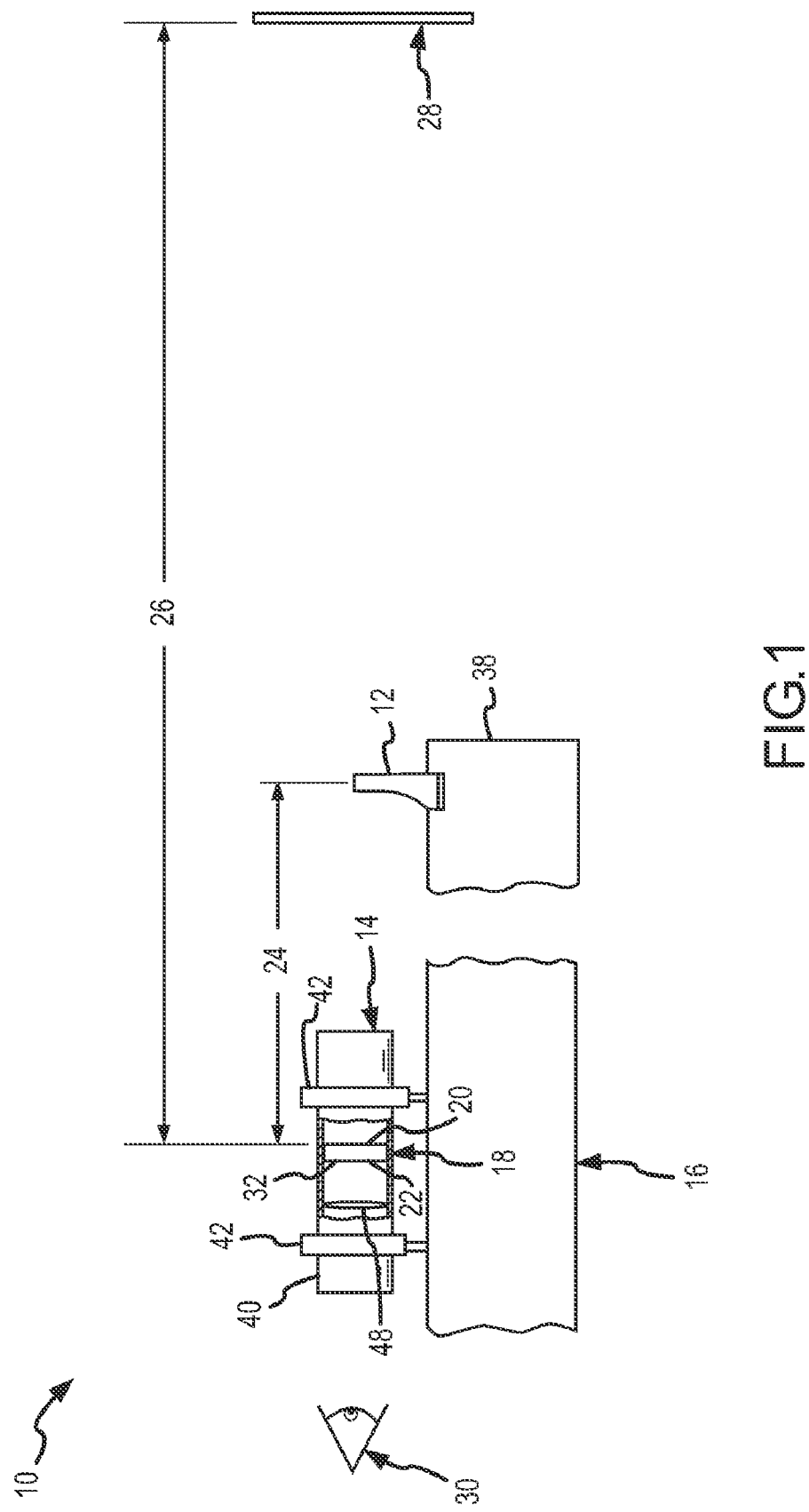
FIG. 1 is a schematic representation of one embodiment of sighting optics as the sighting optics could be utilized on a gun barrel.
Figure 2:
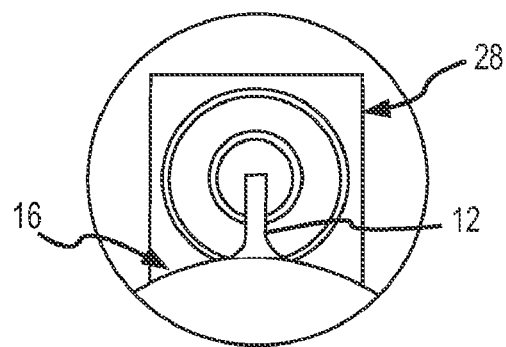
FIG. 2 is a schematic representation of a view looking through sighting optics showing the substantially simultaneously focused images of a front sight and a target.

Sighting optics 10, according to one embodiment of the present invention best seen in FIGS. 1 and 2, may comprise a front sight 12 and a rear sight 14. Front sight 12 and rear sight 14 may be mounted in spaced-apart relation on a suitable sighting platform, such as a gun barrel 16, although other arrangements are possible, as will be described in further detail below. Rear sight 14 may comprise an optical element 18 having a first focal length and a second focal length. As used herein, the term "focal length" refers to the distance at which an object located on an object side 20 of optical element 18 will be substantially brought into focus (as a virtual image) at a defined location (e.g., to a user's eye 30) on an image side 22 of optical element 18. Because optical element 18 is provided with first and second focal lengths, optical element 18 is capable of bringing into substantially simultaneous focus virtual images of objects located at two different positions (i.e., the first focal length and the second focal length) on the object side 20 of optical element 18.

In the embodiment illustrated in FIGS. 1 and 2, the first focal length of optical element 18 is selected so that it is about equal to a distance 24 between optical element 18 and the front sight 12. The second focal length of optical element 18 is selected so that it is about equal to a distance 26 between optical element 18 and an expected position of a target 28. By way of example, in one embodiment, the first focal length is selected to be about 83 cm (about 33 inches), whereas the second focal length is selected to be infinity (∞). Thus, sighting optics 10, according to the teachings provided herein, will bring into substantially simultaneous focus (i.e., as virtual images for a user's eye 30) both the front sight 12 and the target 28. See FIG. 2.

Figure 3:
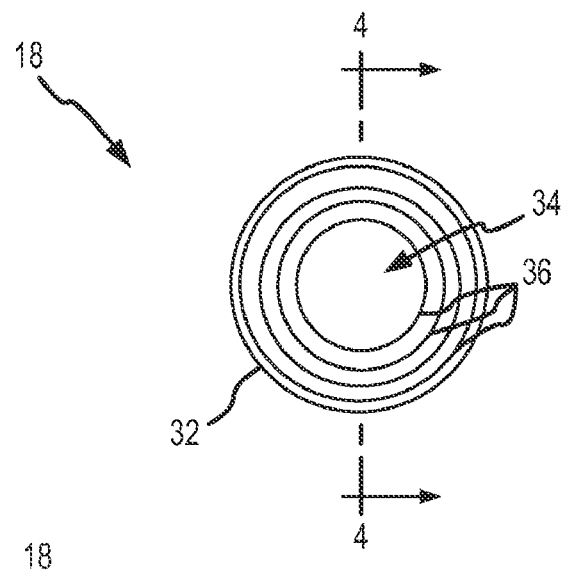
FIG. 3 is a front view in elevation of a first embodiment of an optical element showing a central area and surrounding rings.
Figure 4:
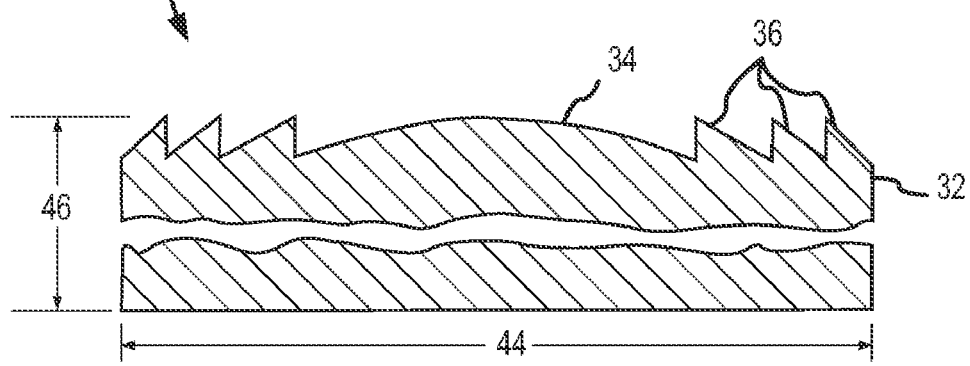
FIG. 4 is an enlarged cross-sectional view in elevation of the first embodiment of the optical element taken along section line 4-4 of FIG. 3.

In one embodiment, optical element 18 may comprise a focusing element, such as a lens 32, as best seen in FIGS. 3 and 4. Lens 32 performs a diffractive focusing function and/or a refractive focusing function in order to bring into simultaneous focus images of objects located at about the first and second focal lengths. More specifically, in one embodiment, lens 32 may comprise a central region or area 34 surrounded by annular rings 36. The central region or area 34 provides the refractive function, whereas the annular rings 36 provide the diffractive function. As will be explained in greater detail herein, the sizes, configurations, and arrangements of the central area 34 and rings 36 are configured to vary the diffraction efficiency of the lens 32 so that it can bring into simultaneous focus objects located at both the first focal length and the second focal length.

In addition to providing the simultaneous focusing function, the lens 32 may also be configured to divide or partition unequally light from the two different focal lengths. For example, a lens 32 according to the teachings provided herein may be constructed so that it biases or partitions more light to the first focal length relative to the second focal length. Accordingly, such a partitioned lens 32 will increase the brightness of images of objects located at the first focal length (e.g., the front sight 12) relative to objects located at the second focal length (e.g., the target 28). Alternatively, lens 32 may be constructed with an opposite bias or partition. That is, lens 32 may be constructed so that it biases or partitions more light to the second focal length relative to the first focal length, thereby increasing the brightness of the image of the target 28 relative to the front sight 12.

Many other types and configurations of optical element 18 are possible, several of which are shown and described herein. For example, in another embodiment, an optical element 118 may comprise a diffractive element, such as a zone plate 132 illustrated in FIGS. 5 and 6. However, unlike lens 32, zone plate 132 performs purely diffractive (as opposed to refractive and diffractive) focusing functions in order to bring into simultaneous focus images of objects located at about the first and second focal lengths. Other embodiments of the optical element may comprise other configurations and/or may be used in conjunction with additional optical elements to provide the dual focus capability and other optical functions, such as corrections for vision irregularities in the user's eye or to provide image magnification, as will be described in greater detail below.

A significant advantage of the sighting optics 10, according to the teachings of the present invention, is that they can be used to bring into substantially simultaneous focus virtual images of objects located at two different positions on the object side 20 of optical element 18. When used in a sighting application, e.g., as a rifle or a bow sight, the sighting optics, according to the teachings provided herein, will allow the user to see, simultaneously, well-focused images of both the front sight and the target, thereby enhancing the ability of the user to acquire and hit the target. Another advantage of the sighting optics of the present invention is that they can be made very small, light, and robust, thereby providing a size, weight, durability, and ruggedness similar to that of conventional "iron sights," but with aiming abilities more akin to those possible with conventional telescopic sights.

Still other advantages are associated with the ability to design the sighting optics so that they bias or partition the light unequally between objects located at the first and second focal lengths. For example, it may be advantageous in certain applications to provide sighting optics that are biased to the first focal length, thereby providing enhanced brightness of the front sight relative to the target. Conversely, it may be advantageous in other applications to provide sighting optics that provide enhanced brightness of the target relative to the front sight, for example, when the target stands at a significant distance.

Having briefly described certain embodiments and variations of sighting optics according to the teachings provided herein, as well as some of their more significant features and advantages, various embodiments and alternative configurations of the sighting optics will now be described in detail. However, before proceeding with the detailed description, it should be noted that while the sighting optics are shown and described herein as they could be used in conjunction with rifles of the type utilized in military and civilian applications, they may be utilized in a wide variety of other applications as well, as would become apparent to persons having ordinary skill in the art after having become familiar with the teachings provided herein. Consequently, the present invention should not be regarded as limited to the particular arrangements and applications shown and described herein.

Referring back now to FIG. 1, sighting optics 10 according to one embodiment of the present invention may comprise a front sight 12 and a rear sight 14. The front and rear sights 12 and 14 may be mounted in spaced-apart relation on a suitable sighting platform, such as a gun barrel 16. In the embodiment shown and described herein, the front sight 12 may comprise a configuration, such as a post, a bead, or a ring-shaped structure of the type commonly utilized in so-called "iron sights." The front sight 12 may be provided at or near the end 38 of gun barrel 16, although other locations along the length of the barrel 16 are possible, as would become apparent to persons having ordinary skill in the art after having become familiar with the teachings provided herein.

Rear sight 14 may be mounted at a rearward location on gun barrel 16, so that a user's eye 30 can conveniently sight through sighting optics 10 and see the virtual images produced by optical element 18. See FIGS. 1 and 2. Alternatively, rear sight 14 could be mounted at other locations, such as the gun receiver, as would become apparent to persons having ordinary skill in the art after having become familiar with the teachings provided herein. In the embodiment shown and described herein, rear sight 14 may comprise a frame or housing 40 sized to receive optical element 18. Alternatively, a housing 40 need not be used, in which case rear sight 14 and optical element 18 would be one and the same.

Frame or housing 40 may comprise any of a wide variety of structures, materials, and configurations depending on the intended application, the particular type of optical element 18 that is to be utilized, as well as on whether any other elements or devices (e.g., lenses, aperture rings, irises, etc.) are to be provided on, inside, or in conjunction with, housing 40. Consequently, the present invention should not be limited to a housing 40 having any particular type of structure or configuration. However, by way of example, in one embodiment, housing 40 may comprise a generally cylindrically shaped structure sized to receive the optical element 18 in the manner illustrated in FIG. 1.

Housing 40 also may be configured to be attached to gun barrel 16 such as, for example, by one or more mounts 42. Mounts 42 may be configured to allow housing 40 to be readily attached to and removed from gun barrel 16, although quick attachment and removal of the housing 40 are not required. In addition, mounts 42 may be configured to allow housing 40 to be adjusted or aimed to allow proper "sighting" of sighting optics 10. Housing 40 may be fabricated from any of a wide variety of materials, such as metals or plastics, suitable for the intended application. By way of example, in one embodiment, housing 40 is fabricated from aluminum.

As briefly mentioned above, sighting optics 10 need not be mounted to a gun barrel 16 and used in connection with a rifle, but could instead be used in any of a wide variety of applications and in conjunction with any of a wide variety of devices wherein the sighting optics 10 of the present invention could be used to advantage. For example, in another application, the front and rear sights (e.g., 12 and 14) could be mounted to a bow or a cross-bow and used in archery applications. In such an application, it may be necessary or desirable to mount the front and rear sights on a separate sighting platform or structure that is mounted to the bow. Alternatively, since sighting optics 10 can be very small, light, and rugged, sighting optics 10 could be mounted on the bowstring and serve as the rear sight for a bow. Still other arrangements are possible, as would become apparent to persons having ordinary skill in the art after having become familiar with the teachings provided herein. Consequently, the present invention should not be regarded as limited to the particular applications and configurations shown and described herein.

Proceeding now with the description, one embodiment of optical element 18 is best seen in FIGS. 3 and 4 and may comprise a lens 32 capable of bringing into substantially simultaneous focus, as virtual images, images of objects located at two different positions, or focal lengths, on the object side 20 of lens 32. See also FIGS. 1 and 2. In order for lens 32 to simultaneously form well-focused virtual images of objects located at two different focal lengths (i.e., first and second focal lengths), lens 32 is provided with refractive and diffractive focusing functions.

One way to achieve the refractive and diffractive focusing functions is to provide lens 32 with a central area 34 that is surrounded by a plurality of rings 36. Central area 34 may comprise a convex surface to provide the refractive focusing function, whereas the rings 36 provide the diffractive focusing function of lens 32.

In order to provide the dual focus capability described herein, i.e., in order for lens 32 to have the first and second focal lengths, a minimum number of rings 36 (typically at least three) needs to be provided. The diameters of the rings 36 will vary depending on the first focal length, the second focal length, and the degree of partitioning desired between the first and second focal lengths. Additionally, the design wavelength (i.e., the wavelength, for design purposes, that is most representative of the predominant illumination present in the environment where the lens 32 will be used) will have an effect on the ring diameters and corresponding clear aperture 44 of lens 32.

Because lens 32 provides a diffractive focusing function, the front sight 12 and target 28 focal lengths may correspond to different focusing "orders" of lens 32. For example, in one embodiment, the distance 24 (FIG. 1), between optical element 18 and front sight 12 (i.e., a first focal length) corresponds to a primary focusing order of lens 32. The distance 26 (FIG. 1), between optical element 18 and target 28 (i.e., a second focal length) corresponds to an infinite focusing order of lens 32. Stated another way, the virtual image of the front sight 12 is formed by the primary focusing order of lens 32, whereas the virtual image of the target 28 is formed by the infinite focusing order of lens 32.

The selections of the particular physical features (e.g., the central area 34 and rings 36) required to provide lens 32 with the desired optical properties (e.g., primary and infinite focusing orders, degree of partitioning between the first and second focal lengths, design wavelength, etc.) may be arrived at by using any of a wide variety of computer programs now known in the art or that may be developed in the future for determining physical lens features based on desired lens performance. By way of example, in one embodiment, the various physical features of lens 32 (e.g., numbers and diameters of the rings 36) presented in Table 1 were calculated by a computer program known as CODE V®, and currently available from Optical Research Associates of Pasadena, Calif. (US).

Table 1 presents ring diameters required for two different first focal lengths (e.g., 60 cm and 83 cm) as well as for two different design wavelengths λ (e.g., 550 nm and 590 nm) for a lens 32 made from fused silica. The data in Table 1 were also determined for substantially equal partitioning between the first and second focal lengths. Because, in one embodiment, the second focal length is selected to be infinity (∞), often referred to as the "zero order beam" of lens 32, the physical lens parameters need not be varied to accomplish focusing at infinity. Depth of field is significant for human vision. Objects will appear to be in focus from infinity all the way down to distances on the order of twenty meters. That is, the effective range of focus for the infinite focal length extends out from about twenty meters. Such a focus capability will be sufficient for virtually all applications. However, if the second focal length is desired to be less than infinity (i.e., less than about twenty meters), then the physical parameters of lens 32 will need to take into account this desired target focal length. In particular, addition of small refractive correction to the light focused by the infinite focusing order diffractive capability will accommodate those cases where it is not. In any event, the ability to select the second focal length to be any desired distance will be within the level of persons having ordinary skill in the art after having become familiar with the teachings provided herein.

TABLE 1

| Ring | f = 83 cm (λ = 550 nm) Diameter (mm) | f = 60 cm (λ = 550 nm) Diameter (mm) | f = 83 cm (λ = 570 nm) Diameter (mm) | f = 60 cm (λ = 570 nm) Diameter (mm) |
|---|---|---|---|---|
| 1 | 1.8510 | 1.5736 | 1.8844 | 1.6020 |
| 2 | 2.6610 | 2.2622 | 2.7090 | 2.3030 |
| 3 | 3.2766 | 2.7856 | 3.3356 | 2.8358 |
| 4 | 3.7936 | 3.2250 | 3.8620 | 3.2832 |
| 5 | 4.2480 | 3.6114 | 4.3246 | 3.6764 |
| 6 | 4.6584 | 3.9602 | 4.7424 | 4.0316 |

As can be seen from the data in Table 1, the overall clear aperture 44 for a lens 32 having the minimum number of three (3) complete rings will be about 3.3 mm for a first focal length (e.g., distance 24) of about 83 cm, a second focal length (e.g., distance 26) of infinity (∞), and a design wavelength λ, of about 550 nm. It should also be noted that the clear aperture 44 of lens 32 decreases as the first focal length decreases, but increases with increasing design wavelength λ.

It should be noted that while the lens 32, illustrated in FIGS. 3 and 4, resembles a Fresnel lens, it differs from a conventional Fresnel lens in several important respects. For example, conventional Fresnel lenses are not usually designed with dual focal lengths and are not typically designed to perform any diffractive focusing function. Indeed, if the clear aperture 44 of lens 32 fails to include a minimum number of rings 36, the diffractive focusing function of the lens 32 will be minimized to the point where the lens 32 would behave as a conventional refractive lens, thereby failing to achieve the desired functionality.

In one embodiment, lens 32 is selected to have a first focal length of about 83 cm, a second focal length of infinity (∞), a design wavelength λ of about 550 nm, a back focal length of about 8 cm, and substantially equal partitioning between the first and second focal lengths. In addition, it was desired to provide lens 32 with six (6) rings 36 (instead of the minimum number of three (3) rings 36), in order to increase overall image brightness. These requirements resulted in a lens 32 having a clear aperture 44 of about 5 mm and a thickness 46 of about 1 mm. The six (6) rings 36 were provided having the specified diameters set forth in Table 1 for the corresponding first focal length and design wavelength λ. The lens 32 comprised fused silica.

While the lens data presented in Table 1 will result in a lens 32 having substantially equal partitioning between the first and second focal lengths, other embodiments may be configured to provide unequal partitioning between the first and second focal lengths. For example, in another embodiment, lens 32 may partition about 60% of the light to the first focal length and about 40% to the second focal length. In still yet another alternative embodiment, lens 32 may partition about 40% of the light to the first focal length and about 60% to the second focal length. Lenses 32 having the characteristics described herein are available from and may be manufactured "to order" by Tessera North America Inc., of Charlotte, N.C., US. Alternatively, lenses 32 having such unequal partitioning may be fabricated in accordance with the teachings provided in U.S. Pat. No. 5,017,000, entitled "Multifocals Using Phase Shifting," which is hereby incorporated herein by reference for all that it discloses.

As already mentioned, rear sight 14 may be provided with additional elements and/or devices to enhance the performance of the sighting optics 10, as may be desired for a particular application. For example, in the embodiment illustrated in FIG. 1, the rear sight 14 may be provided with a supplemental lens 48 that may be located between the optical element 18 and the user's eye 30. Supplemental lens 48 may be used to provide any of a wide range of functions, such as, for example, spherical power correction, cylindrical power correction, or a combination of both, in order to correct for deficiencies in the user's eye 30. The provision of such a supplemental lens 48 may thereby allow a user to use the sighting optics 10 without the need for glasses. In another embodiment, the supplemental lens 48 may provide magnification, allowing the user's eye 30 to perceive enlarged virtual images of the front sight 12 and target 28.

As mentioned above, sighting optics 10 may comprise a number of variations and modifications, many of which are shown and described herein. For example, and with reference now primarily to FIGS. 5 and 6, a second embodiment of the optical element 118 may comprise a diffractive element, such as a zone plate 132. Unlike lens 32 for the first embodiment of optical element 18 (FIG. 1), the zone plate 132 performs purely diffractive focusing functions in order to bring into simultaneous focus images of objects located at or near the first and second focal lengths.

Figure 5:
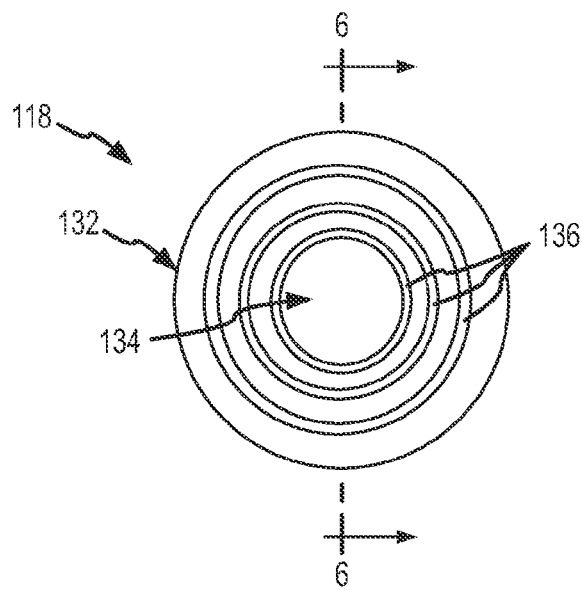
FIG. 5 is a front view in elevation of a second embodiment of an optical element.
Figure 6:
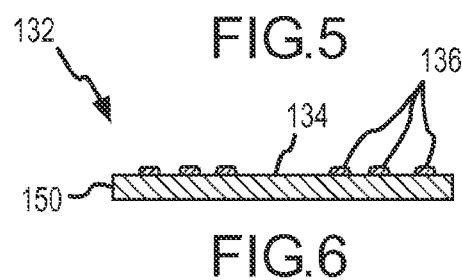
FIG. 6 is an enlarged cross-sectional view in elevation of the second embodiment of the optical element taken along section line 6-6 of FIG. 5.

More specifically, in the embodiment illustrated in FIGS. 5 and 6, zone plate 132 may comprise an optically transparent substrate 150 having a plurality of opaque rings 136 provided thereon. In one embodiment, the rings 136 are arranged so that zone plate 132 comprises a substantially open (i.e., transparent) central region 134. To achieve constructive interference and focusing, every other zone should be blocked, but only those with odd values of "m" within the formula $R_m \approx (f\lambda m/n)^{1/2}$, where "$R_m$" is the radii of the boundaries between the zones, "f" is the focal length, "λ" is the wavelength, and "n" is the refractive index. Blocking zones with even values of "m" would result in only destructive interference. The central region 134 could be blocked or made opaque in addition to the first zone and still get focusing, but this would produce a further loss of light with no benefit.

The first focal length of zone plate 132 may correspond to the first focusing order of the zone plate 132, whereas the second focal length of zone plate 132 may correspond to the zeroth focusing order of the zone plate 132. As was the case for the lens 32 of the first embodiment, the number, sizing, and spacing of the rings 136 of zone plate 132 may be determined based on the various optical parameters desired for zone plate 132. The various optical parameters may include the first focal length, the second focal length, the design wavelength, and the desired degree of partitioning between the first and second focal lengths. Any of a wide variety of computer programs now known in the art or that may be developed in the future may be used to select the number, sizing, and spacing of the rings 136 of zone plate 132 based on the specified optical parameters. However, because persons having ordinary skill in the art would be capable of designing a zone plate 132 having such optical parameters, after having become familiar with the teachings provided herein, particular examples for designing such zone plates 132 will not be described in further detail herein.

Figure 7:
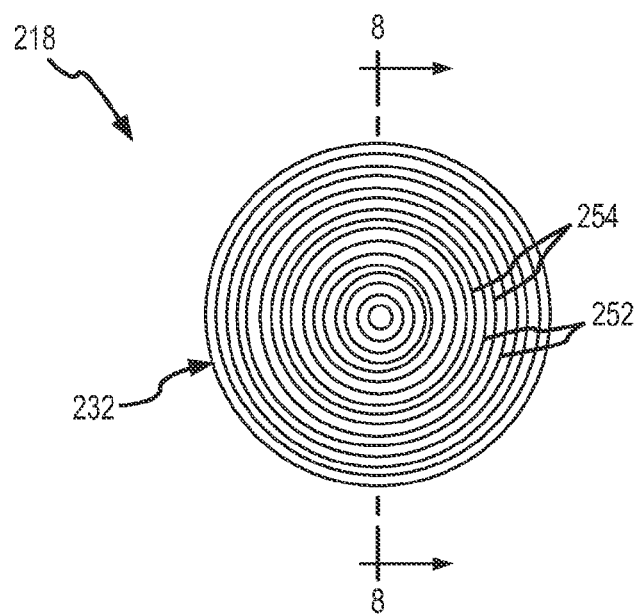
FIG. 7 is a front view in elevation of a third embodiment of an optical element.
Figure 8:
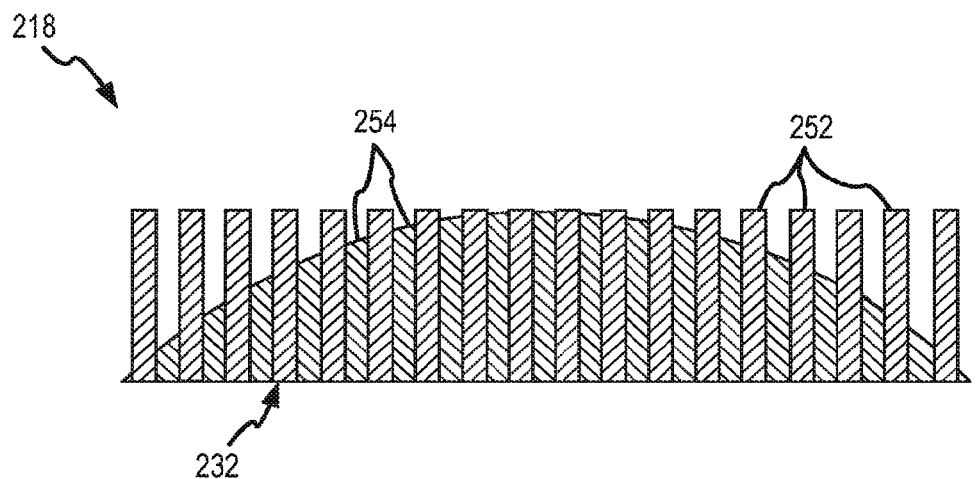
FIG. 8 is an enlarged cross-sectional view in elevation of the third embodiment of the optical element taken along section line 8-8 of FIG. 7.

A third embodiment of an optical element 218 is illustrated in FIGS. 7 and 8. The optical element 218 may be advantageous in cases requiring long first focal lengths and small clear apertures. More specifically, optical element 218 may comprise a transparent member or "lens" 232 comprising a curved portion 254 that is partitioned by a series of concentric rings 252. The concentric rings 252 directly transmit light to pass the target image unaltered, whereas the curved portions 254 between adjacent concentric rings 252 produce the lens (i.e., refractive focusing) function, bringing the front sight 12 into focus. In this embodiment, then, the first focal length (for the front sight 12) is controlled by the curvature of the curved portion 254, whereas the second focal length (i.e., for the target) is controlled by the concentric rings 252. The transparent member 232 may be manufactured by etching a glass blank to produce the desired curved portion 254 while leaving the concentric rings 252 un-etched. Alternatively, such a lens 232 may be obtained from Tessera North America, Inc.

Figure 9:
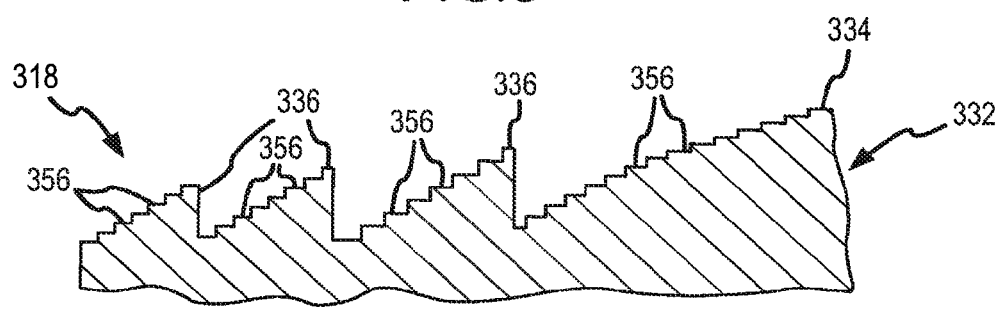
FIG. 9 is an enlarged cross-sectional view in elevation of a portion of a fourth embodiment of an optical element.

A fourth embodiment of an optical element 318 is illustrated in FIG. 9. The fourth embodiment of the optical element 318 is similar to the first embodiment of the optical element 18 and comprises a lens 332 having a central area 334 surrounded by a minimum of three rings 336. However, unlike the first embodiment, each of the three rings 336, as well as the central area 334, is provided with a plurality of steps 356. Steps 356 are sized and spaced so as to create annular zones approximating the angled annular surfaces as are represented by rings 36 to produce constructive interference at the design wavelength. Steps 356 are formed with the necessary precision using a multi-mask photo etching process and may be obtained from Tessera North America, Inc.

Figure 10:
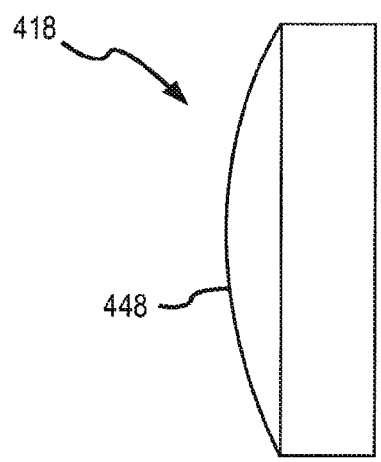
FIG. 10 is a side view in elevation of a fifth embodiment of an optical element.

A fifth embodiment of an optical element 418 is illustrated in FIG. 10. This optical element 418 may be provided with an integral supplemental "lens" formed by a curved image side surface 448. The integral lens formed by curved image side surface 448 may be used to provide any of a wide variety of optical functions. For example, in one application, curved image side surface 448 may be used to replace the separate lens 48 illustrated in FIG. 1. Stated another way, curved image side surface 448 may be configured to supply spherical power correction, cylindrical power correction, or a combination of both, in order to correct for vision deficiencies of the user's eye 30. Curved image side surface 448 may also be used to provide magnification to the virtual images of the front sight 12 and target 28 formed by optical element 18.

Having herein set forth embodiments of the present invention, it is anticipated that suitable modifications can be made thereto which will nonetheless remain within the scope of the invention. The invention shall therefore only be construed in accordance with the following appended claims.

What is claimed:

1. Sighting optics, comprising:
   a front sight; and
   a rear sight spaced from the front sight and comprising an optical element comprising a lens including a plurality of concentric, transparent rings protruding from a surface of the lens, the optical element having a first focal length and a second focal length, the first focal length being about equal to a distance separating the optical element and the front sight, the second focal length being greater than the first focal length and about equal to a distance between the optical element and an intended target.

2. The sighting optics of claim 1, wherein the optical element comprises a refractive element.

3. The sighting optics of claim 2, wherein the optical element comprises a central area and wherein the plurality of concentric, transparent rings surrounds the central area, and wherein the lens is configured to provide at least one of a refractive focusing function and a diffractive focusing function.

4. The sighting optics of claim 3, wherein the first focal length comprises one focusing order of the lens and the second focal length comprises another focusing order of the lens.

5. The sighting optics of claim 3, wherein the first focal length comprises a primary focusing order of the lens and wherein the second focal length comprises an infinite focusing order of the lens.

6. The sighting optics of claim 1, wherein the optical element comprises a diffractive element.

7. The sighting optics of claim 1, wherein the optical element is configured to unequally partition incoming light between the first focal length and second focal length.

8. The sighting optics of claim 7, wherein the optical element is configured to partition about 60% of incoming light to the first focal length and about 40% of the incoming light to the second focal length.

9. The sighting optics of claim 7, wherein the optical element is configured to partition about 40% of incoming light to the first focal length and about 60% of the incoming light to the second focal length.

10. The sighting optics of claim 1, further comprising a lens positioned adjacent the optical element wherein the lens is located between the optical element and an intended position for a user's eye, wherein the lens provides at least one of a spherical power correction, a cylindrical power correction, and a magnification of the front sight and the target.

11. The sighting optics of claim 1, wherein the optical element comprises a convex central area surrounded by the plurality of concentric, transparent rings, wherein the convex central area of the lens provides a refractive focusing function and the plurality of concentric, transparent rings of the lens provides a diffractive focusing function.

12. The sighting optics of claim 1, wherein each of the plurality of concentric, transparent rings and a central area of the optical element comprises an uneven surface having a plurality of steps formed therein, the plurality of steps sized and spaced to produce constructive interference at a design wavelength to provide a focusing function.

13. The sighting optics of claim 1, wherein the optical element comprises a curved portion partitioned by the plurality of concentric, transparent rings.

14. Sighting optics, comprising:
    a front sight; and
    a rear sight spaced from the front sight and comprising an optical element comprising a lens having a central area surrounded by a plurality of rings, the central area of the optical element and the plurality of rings each comprising a plurality of steps formed therein, the plurality of steps being sized and spaced to produce constructive interference at a design wavelength to provide a focusing function, the optical element having a first focal length and a second focal length, the first focal length being about equal to a distance separating the optical element and the front sight and the second focal length being greater than the first focal length.

* * * * *

UNITED STATES PATENT AND TRADEMARK OFFICE
CERTIFICATE OF CORRECTION

PATENT NO. : 8,000,011 B2  
APPLICATION NO. : 12/785892  
DATED : August 16, 2011  
INVENTOR(S) : Crandall Page 1 of 1

It is certified that error appears in the above-identified patent and that said Letters Patent is hereby corrected as shown below:

In the drawings, Fig. 6 should be replaced with the corrected Fig. 6 as shown:

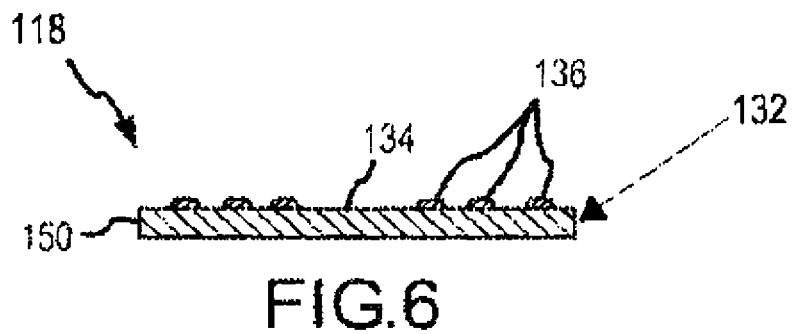

Signed and Sealed this
Eighth Day of April, 2014

Michelle K. Lee
*Deputy Director of the United States Patent and Trademark Office*